(12) United States Patent
Nelson

(10) Patent No.: US 8,121,150 B1
(45) Date of Patent: Feb. 21, 2012

(54) METHOD AND APPARATUS FOR PROCESSING VARIABLE-LENGTH PACKETS IN A BUFFER MEMORY FOR TRANSMISSION

(75) Inventor: Roscoe C. Nelson, Arvade, CO (US)

(73) Assignee: Xilinx, Inc., San Jose, CA (US)

( * ) Notice: Subject to any disclaimer, the term of this patent is extended or adjusted under 35 U.S.C. 154(b) by 822 days.

(21) Appl. No.: 12/199,657

(22) Filed: Aug. 27, 2008

(51) Int. Cl.
*H04J 3/22* (2006.01)

(52) U.S. Cl. ......... 370/471; 370/472; 370/474; 370/476

(58) Field of Classification Search .................. 370/252, 370/428, 470, 471, 472, 474, 476; 709/237; 710/25, 105, 106
See application file for complete search history.

(56) References Cited

U.S. PATENT DOCUMENTS

| | | | | |
|---|---|---|---|---|
| 6,105,079 A | * | 8/2000 | Kuo et al. ........................ | 710/25 |
| 6,304,911 B1 | * | 10/2001 | Brcich et al. ................... | 709/237 |
| 6,765,878 B1 | * | 7/2004 | Carlson ........................... | 370/252 |
| 7,257,655 B1 | * | 8/2007 | Burney et al. .................. | 710/105 |
| 2006/0271714 A1 | * | 11/2006 | Su et al. .......................... | 710/106 |

* cited by examiner

*Primary Examiner* — Hassan Kizou
*Assistant Examiner* — Toan Nguyen
(74) *Attorney, Agent, or Firm* — Robert M. Brush; LeRoy D. Maunu

(57) ABSTRACT

Method and apparatus for processing variable-length packets in a buffer memory for transmission are described. In some examples, as each packet of the packets is written to a buffer memory, a length of the packet is obtained from a length field therein. For each packet of the packets, the length of the packet is compared with a threshold length. An encoded length for each of the packets is stored in a sideband memory, the encoded length for each packet of the packets being: (i) the length of the packet if the length satisfies the threshold; or (ii) a predefined value if the length of the packet does not satisfy the threshold. As each packet of the packets is read from the buffer memory, an end location of the packet is determined responsive to the encoded length thereof in the sideband memory.

16 Claims, 5 Drawing Sheets

METHOD AND APPARATUS FOR PROCESSING VARIABLE-LENGTH PACKETS IN A BUFFER MEMORY FOR TRANSMISSION

FIELD OF THE INVENTION

One or more aspects of the present invention relate generally to integrated circuits and, more particularly, to a method and apparatus for processing variable-length packets in a buffer memory for transmission.

BACKGROUND OF THE INVENTION

Peripheral. Component Interconnect Express (PCI Express) is a low-cost, scalable, switched, point-to-point, serial input/output (IO) interconnection scheme that maintains backward compatibility with PCI. PCI Express provides a number of benefits over existing bus standards, including increased bandwidth availability and support for real-time data transfer services. The PCI Express architecture is specified using an Open System Interconnection (OSI) layer model and uses a load-store addressing architecture with a flat address space to allow interoperability with existing PCI applications. Software layers generate read and write requests that are transported by a transaction layer to IO devices using a packet-based, split-transaction protocol. A link layer adds sequence numbers and cyclic redundancy check (CRC) to these packets to create a highly reliable data transfer mechanism. A basic physical layer includes a dual simplex channel that is implemented as a transmit pair and a receive pair.

Some integrated circuits (ICs), such as programmable logic devices (PLDs), may be configured to include a circuit (a "core") that provides a PCI Express bus interface (a "PCI Express core"). In a PCI Express core, transaction layer packets to be transmitted over a PCI Express bus are stored in a buffer memory. The packets may be read from the buffer memory in a different order than they were written, and each packet may be a different length. It is desirable to transmit the variable-length packets as a stream without gaps. Currently, to allow switching from one packet to the next without incurring a gap in the stream, a flag can be added to the next-to-last word of data in a packet to indicate that the next word is the last word. This can allow the read process time in which to make an end-of-packet determination and jump to the address of the next packet in the buffer memory. Such a technique has two limitations: First, the end-of-packet detection and new address determination must be made in a short period of time (e.g., if one data word is read per clock cycle, the read process must detect the end-of-packet and determine the new address in a single clock cycle). The buffer memory, however, can include a high latency, which makes meeting timing requirements difficult. Second, such a design cannot tolerate any pipeline stages following the buffer memory output, which prevents the use of an external buffer memory (e.g., external to the core).

Accordingly, there exists a need in the art for a method and apparatus for processing variable-length packets stored in a buffer memory for transmission that overcome the aforementioned disadvantages.

SUMMARY OF THE INVENTION

An aspect of the invention relates to a method of processing packets having variable lengths in an integrated circuit. In some embodiments, the method includes: obtaining, as each packet of the packets is written to a buffer memory, a length of the packet from a length field therein; comparing, for each packet of the packets, the length of the packet with a threshold length; storing an encoded length for each of the packets in a sideband memory, the encoded length for each packet of the packets being: (i) the length of the packet if the length satisfies the threshold; or (ii) a predefined value if the length of the packet does not satisfy the threshold; and determining, as each packet of the packets is read from the buffer memory, an end location of the packet responsive to the encoded length thereof in the sideband memory.

An aspect of the invention relates to an apparatus for processing packets having variable lengths in an integrated circuit. In some embodiments, the apparatus includes a core in the integrated circuit. The core includes: a sideband memory; write logic, coupled to the sideband memory, configured to: (a) obtain, as each packet of the packets is written to a buffer memory, a length of the packet from a length field therein; (b) compare, for each packet of the packets, the length of the packet with a threshold length; and (c) store an encoded length for each of the packets in the sideband memory, the encoded length for each packet of the packets being: (i) the length of the packet if the length satisfies the threshold; or (ii) a predefined value if the length of the packet does not satisfy the threshold; and read logic, coupled to the sideband memory, configured to determine, as each packet of the packets is read from the buffer memory, an end location of the packet responsive to the encoded length thereof in the sideband memory.

An aspect of the invention relates to a bus interface. In some embodiments, the bus interface includes: a peripheral; interface logic having processing layers for processing packets transmitted to and from the peripheral; and buffer logic, coupled to the interface logic and configured to buffer the packets. The buffer logic includes: a buffer memory for storing the packets; a sideband memory; write logic, coupled to the sideband memory, configured to: (a) obtain, as each packet of the packets is written to the buffer memory, a length of the packet from a length field therein; (b) compare, for each packet of the packets, the length of the packet with a threshold length; and (c) store an encoded length for each of the packets in the sideband memory, the encoded length for each packet of the packets being: (i) the length of the packet if the length satisfies the threshold; or (ii) a predefined value if the length of the packet does not satisfy the threshold; and read logic, coupled to the sideband memory, configured to determine, as each packet of the packets is read from the buffer memory, an end location of the packet responsive to the encoded length thereof in the sideband memory.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

Figure 1:
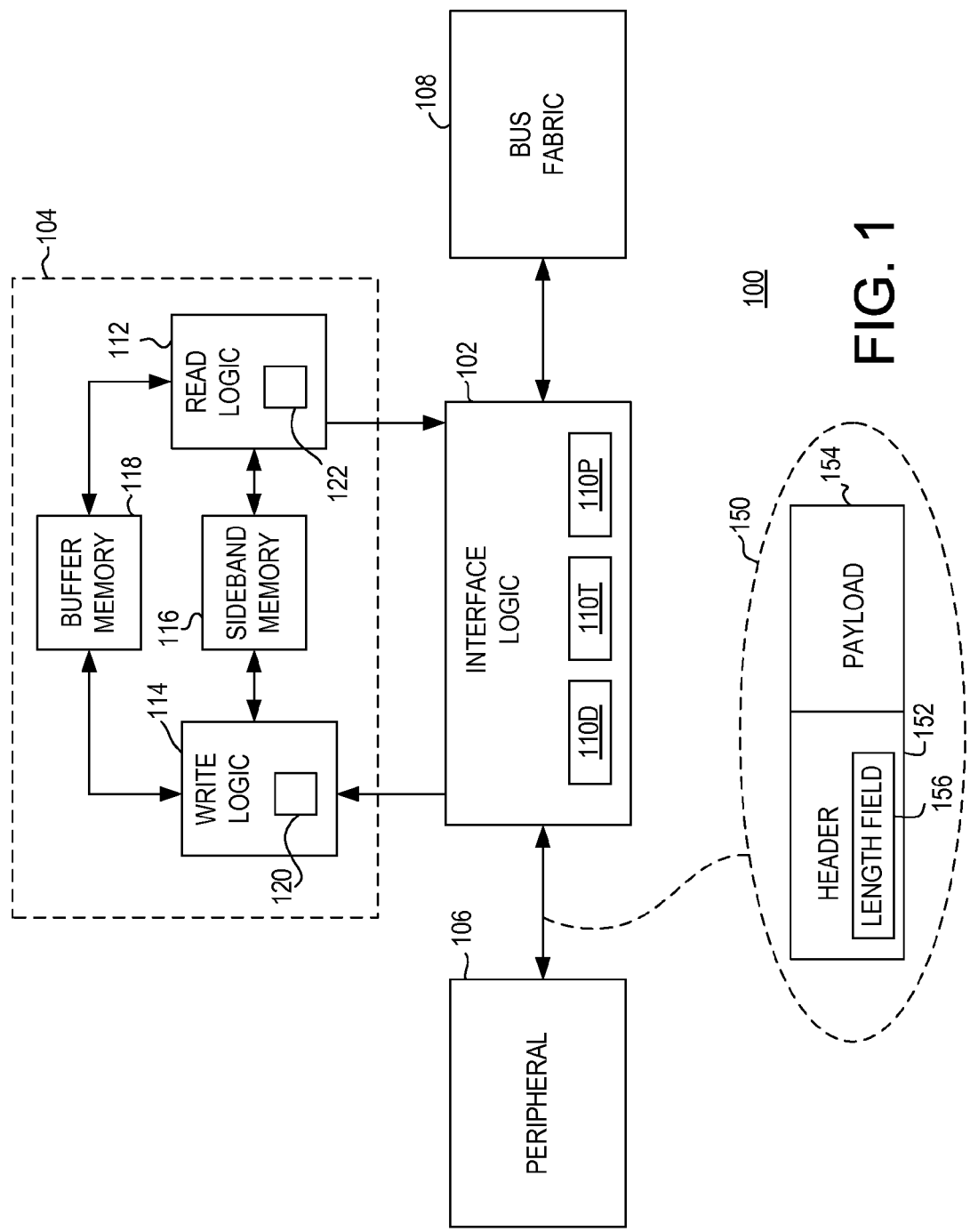
FIG. 1 is a block diagram depicting an exemplary embodiment of a bus interface in accordance with one or more aspects of the invention.

FIG. 1 is a block diagram depicting an exemplary embodiment of a bus interface 100 in accordance with one or more aspects of the invention. The bus interface 100 includes interface logic 102 and buffer logic 104. The interface logic 102 includes a first interface configured for communication with a peripheral 106, and a second interface configured for communication with a bus fabric 108. An input of the buffer logic 104 is coupled to an output of the interface logic 102, and an output of the buffer logic 104 is coupled to an input of the interface logic 102. In general, the bus interface 100 provides an interface between the peripheral 106 and the bus fabric 108. The bus fabric 108 can facilitate communication among various peripherals, including the peripheral 106.

In some embodiments, the peripheral 106 communicates with the interface logic 102 using packets, such as a packet 150. The packets can have variable lengths. A "length" of a packet can indicate the number of data words in the packet, where a data word includes a predefined number of bits. For example, the packet 150 can include a header 152 having one or more data words and a payload 154 having one or more data words. The number of data words comprising the header 152 and the payload 154 is a length 156 of the packet 150. The header 152 can include a field for conveying a value indicative of the length 156 ("length field 158"). The length field 158 may be in one or more data words, or may be part of a data word. The number of bits in the length field 158 can be dictated by the maximum number of data words for any given packet. For example, if the maximum number of data words in any of the packets is 100, than the length field 158 can include seven bits. From packet-to-packet, the header 152 and/or the payload 154 can include different numbers of data words such that the packets can have different lengths.

To transmit information from the peripheral 106 to another device on the bus fabric 108, the peripheral 106 can transmit packets to the interface logic 102. The interface logic 102 can include a plurality of processing layers 110 for processing the packets for transmission as physical signals over the bus fabric 108. To receive information from another device on the bus fabric 108, the interface logic 102 receives physical signals from the bus fabric 108. The received signals are processed through the processing layers 110 to obtain packets, which are in turn transmitted to the peripheral 106. In general, the processing layers 110 can include one or more functions of generating and processing packets, flow control management, initialization and power management, data protection, error checking and retry, physical link interface initialization, maintenance and status tracking, serialization, de-serialization, and the like. The interface logic 102 can thus include circuitry for performing one or more of the aforementioned functions.

In some embodiments, packets to be transmitted from the peripheral 106 are buffered by the bus interface 100 using the buffer logic 104. That is, the interface logic 102 receives packets from the peripheral 106, provides the packets to the buffer logic 104, obtains the packets from the buffer logic 104, and transmits the packets over the bus fabric 108. In some embodiments, the buffer logic 104 can include read logic 112, write logic 114, and a memory 116 (referred to as a "sideband memory"). In some embodiments, the buffer logic 104 can include a buffer memory 118. Alternatively, in some embodiments, the buffer memory 118 can be an external memory, i.e., external to the buffer logic 104, or external to the entire bus interface 100.

An input of the write logic 114 is coupled to the input of the buffer logic 104. Outputs of the write logic 114 are coupled to inputs of the buffer memory 118 and the sideband memory 116, respectively. An output of the read logic 112 is coupled to the output of the buffer logic 104. Inputs of the read logic 112 are coupled to interfaces of the buffer memory 118 and the sideband memory 116, respectively. In some embodiments, the buffer memory 118 can include a plurality of ports (e.g., a dual port memory), and the write logic 114 can be coupled to one port while the read logic 112 is coupled to the other port. Alternatively, the buffer memory 118 can be a single-port device, and the read logic 112 and the write logic 114 can communicate with the buffer memory 118 through a memory bus (not shown). The buffer memory 118 can comprise a random access memory (RAM) that has a particular latency between addressing and data delivery/storage.

In general operation, the write logic 114 is configured to obtain packets from the interface logic 102 and write packets to the buffer memory 118. The read logic 112 is configured to read packets from the buffer memory 118 and provide packets to the interface logic 102. The read logic 112 can operate such that a continuous stream of packets is provided to the interface logic 102 without gaps between the packets.

In some embodiments, the write logic 114 includes calculation logic 120. The calculation logic 120 is configured to read the length field of each packet obtained by the write logic 114. For each packet, the calculation logic 120 compares the length of the packet as obtained from its length field with a threshold length. If the length of the packet satisfies the threshold length (e.g., is less than or equal to the threshold length), then the calculation logic 120 encodes the length of the packet to produce an encoded length value ("encoded length"). If the length of the packet does not satisfy the threshold length (e.g., is greater than the threshold length), then the calculation logic 120 produces an encoded length having a predefined value for the packet. The encoded length is represented using less bits than the length of the packet (i.e., the number of bits in the length field).

For example, consider a case where the length of each packet is constrained to be between two data words and 131 data words. In such an example, the length field 158 must include 8 bits in order to represent all possible lengths. Assume the threshold length used by the calculation logic 120 is seven data words. If a packet has a length less than or equal to seven data words, then the calculation logic 120 encodes the length into an encoded length value. Since there are only 6 possible lengths (2-7 data words) below the threshold, then the encoded length can be represented using three bits. The encoding scheme can be the conventional binary scheme (e.g., a length of 2 data words is represented by '010', a length of 3 data words is represented by '011', and so on until a length of 7 data words is represented by '111'). If a packet has a length greater than seven data words, then the calculation logic 120 sets the encoded length for the packet to a predefined value. For example, the predefined value can be zero ('000'). Those skilled in the art will appreciate that this example can be extended for other maximum length values (requiring more or less bits in the length field 158) and/or other threshold values (requiring more or less bits in the encoded length).

The calculation logic 120 stores the encoded length for each packet stored in the buffer memory 118 in the sideband memory 116. That is, for each packet stored in the buffer memory 118, the sideband memory 116 includes the encoded length value. In some embodiments, the sideband memory 116 may be functionally implemented as a look-up table that correlates packets in the buffer memory 118 with their encoded lengths as produced by the calculation logic 120. The sideband memory 116 may identify each packet by its start address in the buffer memory 118. Such a look-up table can be implemented using various types of memory circuitry known in the art. For example, the sideband memory 116 can be implemented using register logic, shift register logic, RAM, or the like. Notably, the sideband memory 116 requires less bits to represent the encoded length of a packet than the number of bits used to represent its length in the length field 158.

The read logic 112 may include decoder logic 122. For each packet read from the buffer memory 118, the decoder logic 122 obtains its corresponding encoded length from the sideband memory 116. If the sideband memory 116 functions as a lookup-table, the decoder logic 112 can obtain the correct encoded value for a packet based on its start address in the buffer memory 118. If the encoded length for a packet is a value other than the predefined value, the decoder logic 112 obtains a length for the packet directly by decoding the encoded length value. This obviates the need to decode the length from the length field 158 of the packet. Given the encoded length, the decoder logic 112 can determine the end address of a packet in the buffer memory 118. For example, the decoder logic 112 can determine an offset from the encoded value that can be added to the start address of the packet to determine the end address of the packet. In some embodiments, the offset can be determined quickly using a lookup table in the decoder logic 122 that stores an offset for each possible encoded length value. If the encoded length for a packet is the predefined value, the decoder logic 112 obtains a length for the packet from the packet itself, i.e., from the length field 158 of the packet.

The above-described embodiments of the encoded length scheme exhibit several advantages. First, the encoded lengths in the sideband memory 116 allow the read logic 112 to determine the end of each packet being read before the end of the packet is actually reached. In this manner, the read logic 112 can jump to the start address of the next packet to read without a delay so that there is not a gap in the sequence of packets being provided to the interface logic 102. The threshold length used by the calculation logic 120 can be set based on the latency of the buffer memory 118. For example, assume the read latency of the buffer memory 118 is seven clock cycles. Then, as in the example above, the threshold length can be set to seven data words. Thus, if a packet being read from the buffer memory 118 has a length less than or equal to seven data words, the decoder logic 122 can start to determine the end address for the packet before receiving the length field 158. If the time it takes to decode the end address of a packet directly from the encoded length is less than the time it takes to process the smallest length packet, then the read logic 112 can provide an output packet stream without gaps. For example, the decoder logic 122 can be configured to obtain an end address directly from an encoded length in a single clock cycle, allowing a determination of the end address for a packet having a length of two words (assuming one clock cycle per word). On the other hand, if a packet has a length longer than seven data words, the decoder logic 122 has time to receive the length field 158 directly from the packet and compute the end address based on the length in the length field 158. Those skilled in the art will appreciate that this example can be extended for other maximum length values (requiring more or less bits in the length field 158) and/or other threshold values (based on more or less latency of the buffer memory 118). For example, if the buffer memory 118 has 12 cycles of latency, then the threshold can be increased to 12 data words, requiring the encoded length to be four bits in length. If the buffer memory 118 had only a one cycle latency, then the threshold can be decreased to one data word, allowing the encoded length to be a two-bit value.

Furthermore, the buffer logic 104 employs minimal resources for tracking the encoded lengths of the packets in the buffer memory 118. As discussed above, the encoded length is represented using less bits than the length field 158 in the packet, allowing the sideband memory 116 to be smaller than if the entire length field for each packet was stored therein. A smaller sideband memory 116 can conserve resources. For example, if the bus interface 100 is embedded as a core in an integrated circuit (IC), then a smaller sideband memory 116 can conserve area and/or power. If the bus interface 100 is configured in a programmable logic device (PLD), then a smaller sideband memory 116 can conserve configurable resources used to implement the bus interface 100.

In the embodiments described above, the buffer logic 104 is used to buffer packets being transmitted by the peripheral 106. Those skilled in the art will appreciate that the buffer logic 104 can be configured in a similar manner to buffer packets being received from the bus fabric 108.

In some embodiments, the bus interface 100 can comprise a Peripheral Component Interconnect Express (PCI-Express) interface and the bus fabric 108 can comprise a PCI-Express fabric. The packets communicated between the peripheral 106 and the interface logic 102 can be transaction-layer packets (TLPs). As is known in the art, PCI-Express defines three processing layers and thus the processing layers 110 can include a transaction layer 110T, a data link layer 110D, and a physical layer 110P. The transaction layer 110T is the upper layer in the PCI Express architecture and its primary function is to accept, buffer, and disseminate TLPs. The TLPs communicate information to and from the peripheral 106 in terms of transactions. The data link layer 110D acts as an intermediate stage between the transaction layer 110T and the physical layer 110P. The data link layer 110D provides a reliable mechanism for the exchange of TLPs between two components on a link. The physical layer 110P produces the physical signaling used to communicate information across the PCI Express bus fabric. Thus, in such embodiments, the packets buffered and processed by the buffer logic 104 can be TLPs in a PCI Express architecture.

Figure 2:
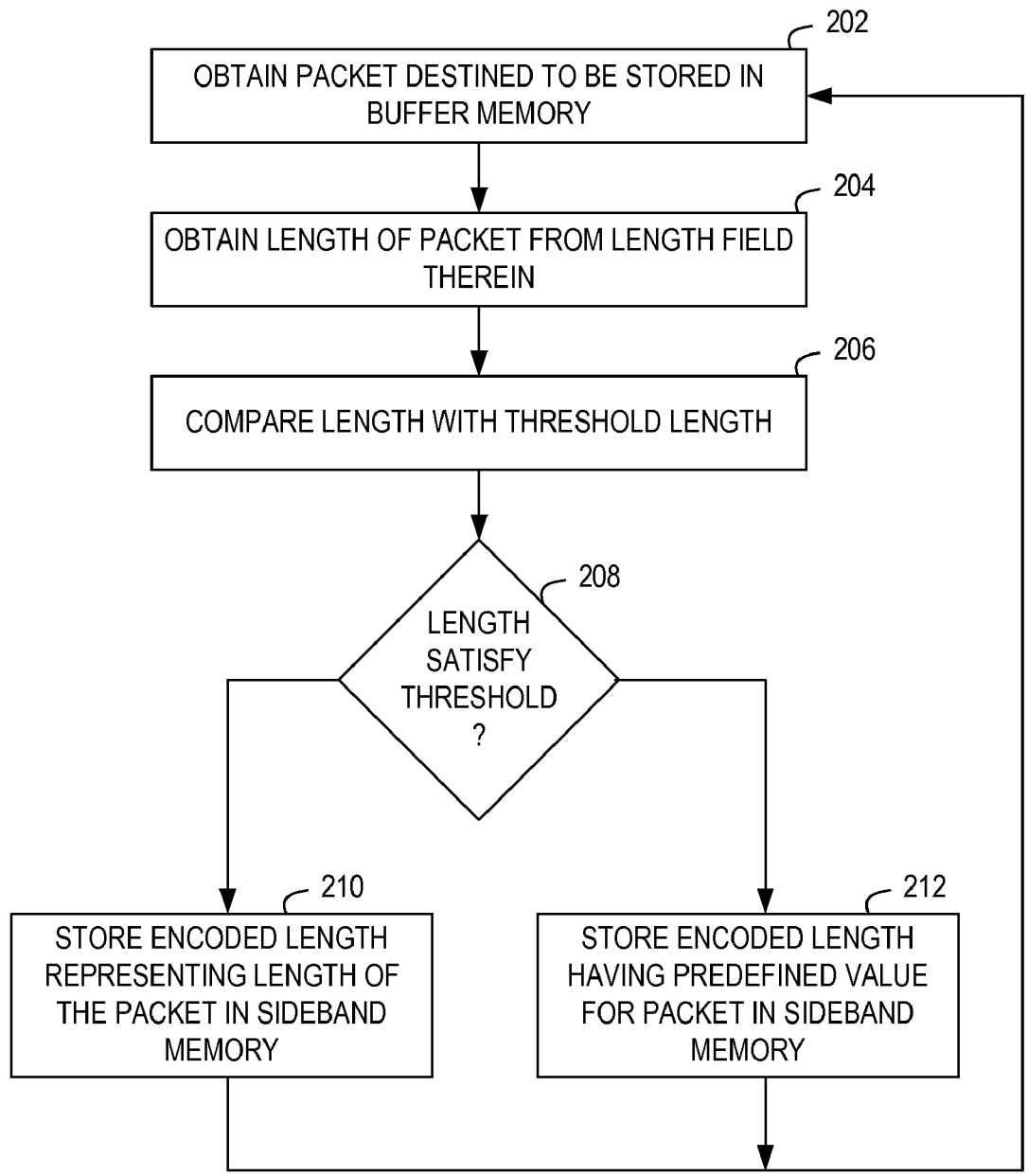
FIG. 2 is a flow diagram depicting an exemplary embodiment of a method for writing packets having variable lengths to a buffer in accordance with one or more aspects of the invention.

FIG. 2 is a flow diagram depicting an exemplary embodiment of a method 200 for writing packets having variable lengths to a buffer in accordance with one or more aspects of the invention. The method 200 begins at step 202, where a packet destined for storage in a buffer memory is obtained. At step 204, a length of the packet is obtained from a length field therein. At step 206, the length of the packet is compared with a threshold length. At step 208, a determination is made whether the length of the packet satisfies the threshold length. If so, the method 200 proceeds to step 210. At step 210, an encoded length that represents the length of the packet is stored in a sideband memory for the packet. If at step 208, the length does not satisfy the threshold, the method proceeds to step 212. At step 212, an encoded length having a predefined value is stored in the sideband memory for the packet. The method 200 returns to step 202 from either step 210 or step 212 and repeats for additional packets. The method 200 may be performed by the write logic 114 and the calculation logic 120 described above.

Figure 3:
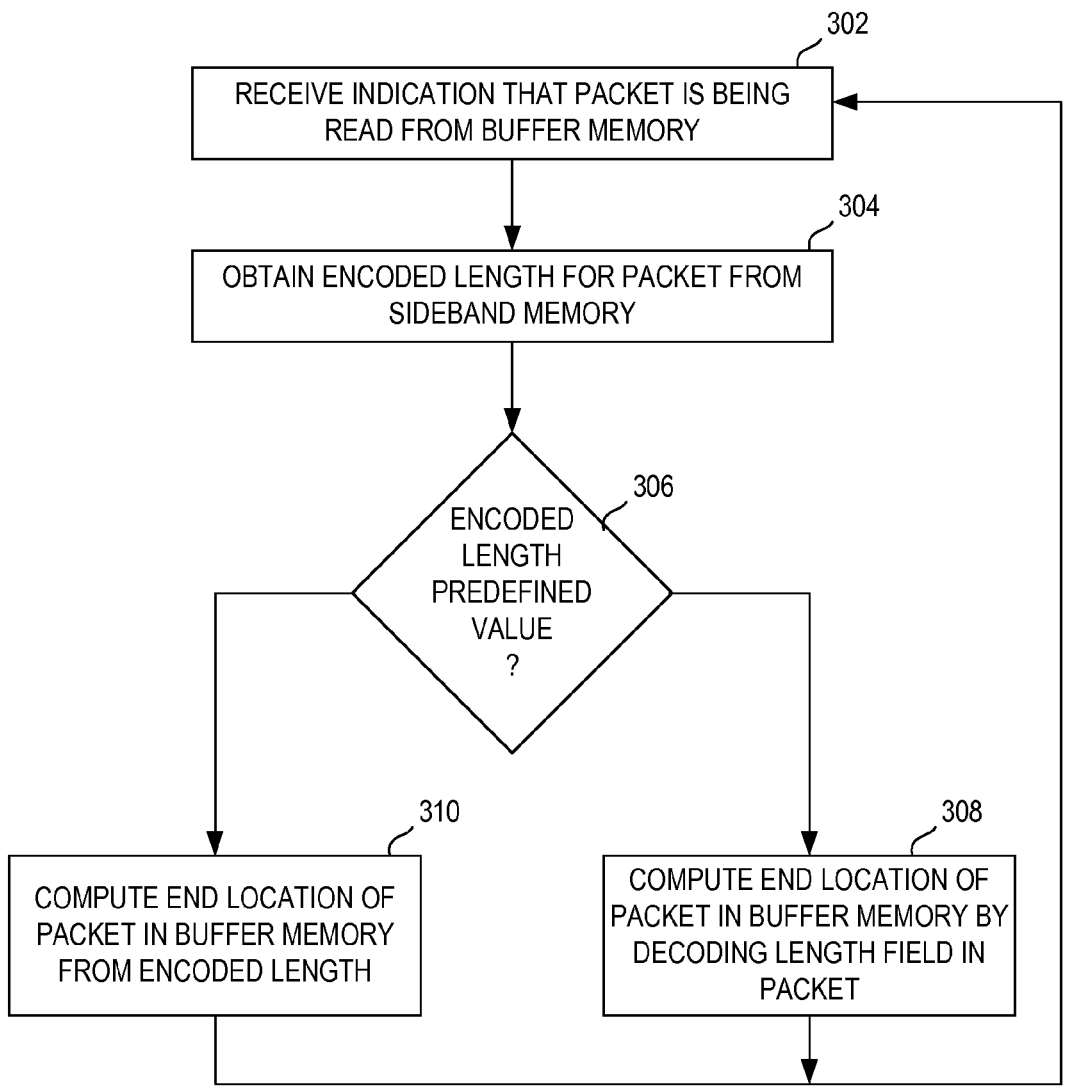
FIG. 3 is a flow diagram depicting an exemplary embodiment of a method for reading packets having variable lengths from a buffer in accordance with one or more aspects of the invention.

FIG. 3 is a flow diagram depicting an exemplary embodiment of a method 300 for reading packets having variable lengths from a buffer in accordance with one or more aspects of the invention. The method 300 begins at step 302, where an indication is received that a packet is being read from the buffer memory. At step 304, an encoded length for the packet being read is obtained from a sideband memory. For example, the indication may include a start address of the packet in the buffer memory, and the encoded length may be obtained from the sideband memory using the start address as a lookup index. At step 306, at determination is made whether the encoded length is the predefined value. If so, the method 300 proceeds to step 308. At step 308, an end location of the packet in the buffer memory is computed by decoding the length from the length field in the packet. If at step 306 the encoded length is not the predefined value, the method 300 proceeds to step 310. At step 310, an end location of the packet in the buffer memory is computed from the encoded length itself. The method 300 returns to step 302 from either step 308 or step 310 and repeats for additional packets being read from the buffer memory. The method 300 may be performed by the read logic 116 and the decoder logic 122 described above.

Figure 4:
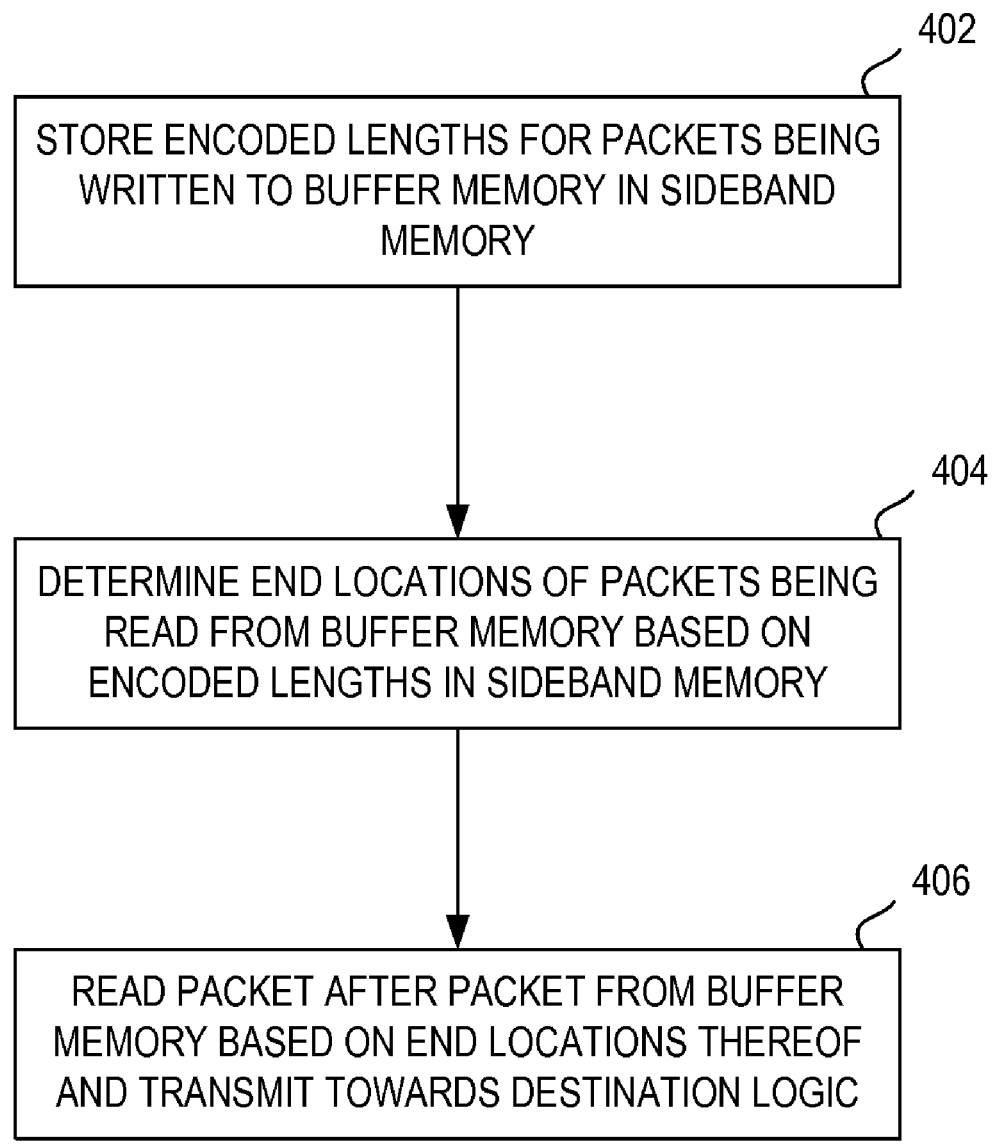
FIG. 4 is a flow diagram depicting an exemplary embodiment of a method for processing packets having variable lengths in an integrated circuit (IC) in accordance with one or more aspects of the invention.

FIG. 4 is a flow diagram depicting an exemplary embodiment of a method 400 for processing packets having variable lengths in an integrated circuit (IC) in accordance with one or more aspects of the invention. The method 400 begins at step 402, where encoded lengths for packets being written to a buffer memory are stored in a sideband memory. Step 402 may be performed by executing the method 200 for each of the packets being written. At step 404, end locations of packets being read from the buffer memory are determined based on the encoded lengths in the sideband memory. Step 404 may be performed by executing the method 300 for each of the packets being read. At step 406, the packet after packet as read from the buffer memory based on the end locations thereof and transmitted towards destination logic. For clarity, the steps 402 through 406 of the method 400 are shown and described sequentially. It is to be understood, however, that the steps 402 through 406 may be concurrently executed. The method 400 may be performed by the buffer logic 104 described above.

Figure 5:
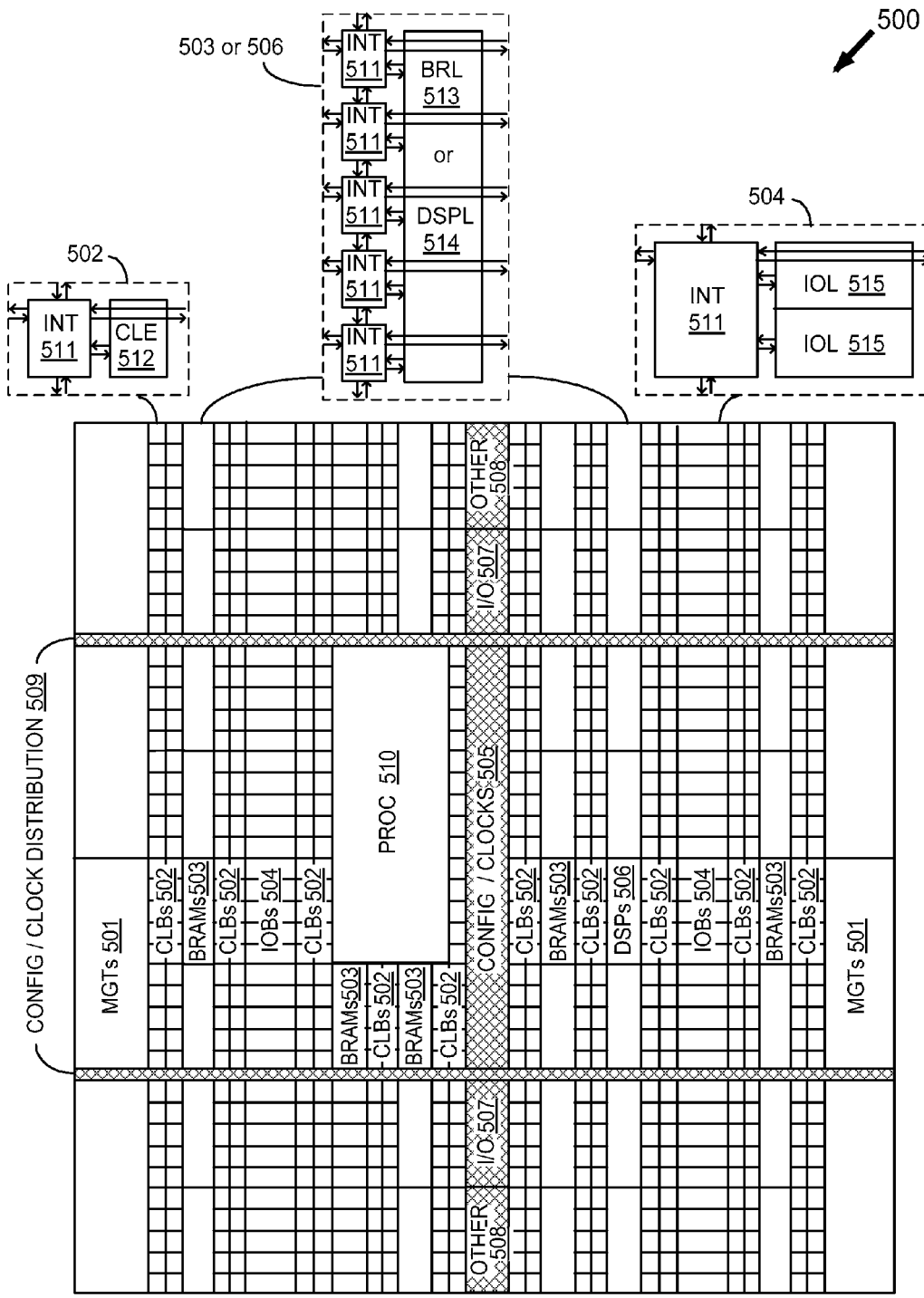
FIG. 5 illustrates an FPGA architecture in accordance with one or more aspects of the invention.

FIG. 5 illustrates an FPGA architecture 500 that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. A given set of programmable tiles of an FPGA is referred to herein as a programmable fabric of the FPGA.

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT 511). A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element (INT 511). As will be clear to those of skill in the art, the actual I/O pads connected, for example, to the I/O logic element 515 are manufactured using metal layered above the various illustrated logic blocks, and typically are not confined to the area of the input/output logic element 515.

The FPGA architecture 500 also includes one or more dedicated processor blocks (PROC 510). The processor block 510 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic (e.g., CLBs, IOBs). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art. The processor block 510 is coupled to the programmable logic of the FPGA in a well known manner.

In the pictured embodiment, a columnar area near the center of the die is used for configuration, clock, and other control logic. Horizontal areas 509 extending from this column are used to distribute the clocks and configuration signals across the breadth of the FPGA. In other embodiments, the configuration logic may be located in different areas of the FPGA die, such as in the corners of the FPGA die. Configuration information for the programmable logic is stored in configuration memory. The configuration logic 505 provides an interface to, and loads configuration data to, the configuration memory. A stream of configuration data ("configuration bitstream") may be coupled to the configuration logic 505, which in turn loads the configuration memory.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations as well as the location of the blocks within the array included at the top of FIG. 5 are purely exemplary. For example, in an actual FPGA more than one adjacent column of CLBs is typically included wherever the CLBs appear, to facilitate the efficient implementation of user logic.

The bus interface 100 may be configured in an IC, such as the FPGA 100 described above. For example, the interface logic 102, the peripheral 106, and the buffer logic 104 may be configured using the programmable logic resources of the FPGA 100. The bus fabric 108 may be external to the FPGA 100, and the interface logic 102 may communicate with the bus fabric 108 via an external interface of the FPGA 100 (e.g., IOBs 504). The sideband memory 116 can be implemented using register logic, shift register logic, RAM (e.g., LUTRAM, BRAM, etc), or the like in the FPGA 100. The buffer memory 118 may be implemented within the FPGA 100 (e.g., using BRAM) or external to the FPGA 100.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

What is claimed is:

1. A method of processing packets having variable lengths in an integrated circuit, comprising:
    obtaining, as each packet of the packets is written to a buffer memory, a length of the packet from a length field therein;
    comparing, for each packet of the packets, the length of the packet with a threshold length;
    storing an encoded length for each of the packets in a sideband memory, wherein the encoded length for each packet of the packets is the length of the packet if the length satisfies the threshold value and is a predefined value if the length of the packet does not satisfy the threshold; and
    determining, as each packet of the packets is read from the buffer memory, a starting address of a next packet to read from the buffer memory responsive to the encoded length thereof in the sideband memory;
    wherein the determining includes:
        in response to the encoded length from the sideband memory not being the predefined value, determining the starting address of the next packet to read from the buffer memory from the encoded length from the sideband memory; and
        in response to the encoded length from the sideband memory being the predefined value, determining the starting address of the next packet to read from the length field of the packet read from the buffer memory.

2. The method of claim 1, wherein the threshold length is based on a latency of the buffer memory.

3. The method of claim 1, further comprising:
    transmitting the packets towards destination logic by reading packet after packet based on end locations in the buffer memory as determined for the packets.

4. The method of claim 1, wherein the packets comprise transaction layer packets (TLPs) for communication through a transaction-based bus architecture.

5. The method of claim 1, wherein the encoded length of each packet of the packets is stored in the sideband memory using less bits than a number of bits representing the length of the packet in the length field thereof.

6. The method of claim 1, wherein the integrated circuit comprises a programmable logic device, and wherein the buffer memory comprises block random access memory (BRAM).

7. An apparatus for processing packets having variable lengths in an integrated circuit, comprising:
    a core in the integrated circuit, the core including:
        a sideband memory;
        write logic, coupled to the sideband memory, configured to: (a) obtain, as each packet of the packets is written to a buffer memory, a length of the packet from a length field therein; (b) compare, for each packet of the packets, the length of the packet with a threshold length; and (c) store an encoded length for each of the packets in the sideband memory, the encoded length for each packet of the packets being: (i) the length of the packet if the length satisfies the threshold; or (ii) a predefined value if the length of the packet does not satisfy the threshold; and
        read logic, coupled to the sideband memory, configured to determine a starting address of a next packet to read from the buffer memory as each packet of the packets is read from the buffer memory, wherein:
            in response to the encoded length from the sideband memory not being the predefined value, the read logic determines the starting address of the next packet to read from the buffer memory from the encoded length from the sideband memory; and
            in response to the encoded length from the sideband memory being the predefined value, the read logic determines the starting address of the next packet to read from the length field of the packet read from the buffer memory.

8. The apparatus of claim 7, wherein the threshold length is based on a latency of the buffer memory.

9. The apparatus of claim 7, wherein the core further comprises:
    an input/output (IO) interface configured to transmit the packets towards destination logic by reading packet after packet based on end locations in the buffer memory as determined for the packets.

10. The apparatus of claim 7, wherein the encoded length of each packet of the packets is stored in the sideband memory using less bits than a number of bits representing the length of the packet in the length field thereof.

11. The apparatus of claim 7, wherein the integrated circuit comprises a programmable logic device (PLD), and the core is implemented using programmable logic of the PLD.

12. A bus interface, comprising:
    a peripheral;
    interface logic having processing layers for processing packets transmitted to and from the peripheral; and
    buffer logic, coupled to the interface logic and configured to buffer the packets, the buffer logic including:
        a buffer memory for storing the packets;
        a sideband memory;
        write logic, coupled to the sideband memory, configured to: (a) obtain, as each packet of the packets is written to the buffer memory, a length of the packet from a length field therein; (b) compare, for each packet of the packets, the length of the packet with a threshold length; and (c) store an encoded length for each of the packets in the sideband memory, the encoded length for each packet of the packets being: (i) the length of the packet if the length satisfies the threshold; or (ii) a predefined value if the length of the packet does not satisfy the threshold; and
        read logic, coupled to the sideband memory, configured to determine a starting address of a next packet to read from the buffer memory as each packet of the packets is read from the buffer memory, wherein:
            in response to the encoded length from the sideband memory not being the predefined value, the read logic determines the starting address of the next packet to read from the buffer memory from the encoded length from the sideband memory; and
            in response to the encoded length from the sideband memory being the predefined value, the read logic determines the starting address of the next packet to read from the length field of the packet read from the buffer memory.

13. The bus interface of claim 12, wherein the threshold length is based on a latency of the buffer memory.

14. The bus interface of claim 12, wherein the encoded length of each packet of the packets is stored in the sideband memory using less bits than a number of bits representing the length of the packet in the length field thereof.

15. The bus interface of claim 12, wherein the packets comprise transaction layer packets (TLPs) for communication through a transaction-based bus architecture.

16. The bus interface of claim 15, wherein the processing layers in the interface logic comprise PCI-EXPRESS processing layers.

* * * * *